EXCITER SIDE

TURBOSIDE

Inventors:
Wilhelm Eggemann
Erich Weghaupt
Dietrich Lambrecht
BY Spencer & Kaye
Attorneys

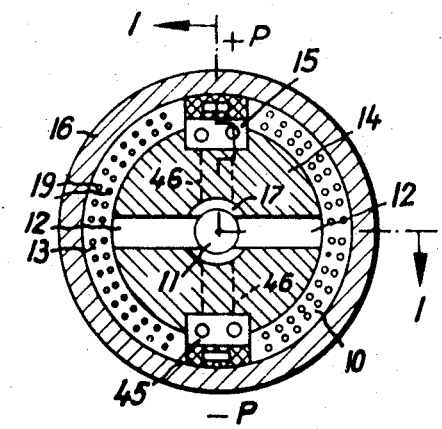

United States Patent Office 3,469,127
Patented Sept. 23, 1969

3,469,127
ROTOR COOLING ARRANGEMENT
Wilhelm Eggemann, Erich Weghaupt, and Dietrich Lambrecht, Mulheim (Ruhr), Germany, assignors to Licentia Patent-Verwaltungs-G.m.b.H., Frankfurt am Main, Germany
Filed Dec. 27, 1967, Ser. No. 693,990
Claims priority, application Germany, Dec. 28, 1966, C 55,386
Int. Cl. H02k 9/20
U.S. Cl. 310—54                                         13 Claims

ABSTRACT OF THE DISCLOSURE

A rotor of an electrical machine having a liquid-cooled rotor winding. Coolant inlet and outlet chambers are located in a pole plane and on but one end of the rotor shaft, there being a collector chamber at the other end of the rotor shaft. Inlet tubes extend from the inlet chambers to one of two winding heads and outlet tubes extend from the other winding head to the collector chamber, there being return conduits extending from the collector chamber to the outlet chambers. The inlet and outlet tubes as well as the return conduits are arranged at the circumference of the rotor shaft and are so mounted and secured as to subject them to a minimum of stress and also so as to afford ready access in case repairs are required.

BACKGROUND OF THE INVENTION

The present invention relates to an arrangement for circulating a liquid coolant through the hollow conductors of an electrical rotor.

In the case of large electrical machines, certain problems arise in circulating a liquid coolant through the rotor windings. Consequently, known systems for liquid-cooling the rotor windings encounter various manufacturing and engineering difficulties, particularly insofar as piping the coolant first to and then from the individual turns of the rotor winding is concerned. Indeed, in order to meet various manufacturing and safety criteria, large machines incorporating liquid-cooled rotors are subject to certain operating limitations.

The following types of systems for liquid-cooling the rotor windings are known:

The liquid is piped to and away from each individual half-turn of the rotor winding in the region of the body of the winding, this piping being done by way of distributors which are arranged within the windings in the winding slots. The liquid coolant is piped to and away from the hollow conductors by way of tubes which are located in groove channels. However, the distributors as well as the tubes take up much space, which means that only a relatively small portion of the winding slots can be filled with the actual copper windings. Moreover, the distributors can not exceed certain dimensions, these being determined by the amount of space which is available in the slots. Furthermore, the liquid conduits are not readily accessible, which may create considerable problems in case a leak develops. Another difficulty is that of providing adequate electrical insulation for the conduits.

The liquid coolant is normally supplied to the windings of the inductor of a large machine such as a turbogenerator at the exciter side, that is to say, the winding has two winding heads, one being located on the torque-transmitting end of the rotor shaft and the other on the exciter end, which does not transmit any appreciable torque, and it is to the winding head on the exciter side to which the liquid coolant is initially supplied. The coolant is removed from the windings at the winding head on the turboside. The insulated conduit couplings are, conventionally, arranged in the winding heads. This arrangement has the inevitable drawback that it becomes exceedingly difficult to circulate a coolant through each half of each turn so that, in practice, a plurality of half-turns are provided with one flow of liquid. But, this materially reduces the efficiency of the cooling.

Another characteristic common to heretofore known cooling arrangements is that liquid which leaves the windings on the turboside is piped out of the rotor either on the turboside end portion of the rotor shaft or is made to flow through a central bore extending through the conductor to the exciter end portion of the rotor shaft. The latter arrangement requires an additional fluid connection—one already being provided at the exciter side of the machine—which, in turn, requires additional sealing means. If, alternatively, the coolant is to be taken out of the rotor at the exciter side to which it is piped via the central bore, there arises the problem of making the liquid flow radially inwardly from the periphery of the rotor to the central bore. This means that the rotor has to have radial channels which reduce the mechanical strength of the turboside end of the shaft, i.e., the shaft end which is called upon to transmit the torque. This torque, it will be appreciated, will sometimes be very high indeed, for example, when a short-circuit current pulse flows through the rotor windings. Also, it must be borne in mind that the central conduit, which must extend throughout the entire electrically active, axial length of the inductor, reduces the cross-sectional area which is available for purposes of forming the magnetic yoke, which, in turn, reduces the electrical capacity of the machine.

It has been sought to overcome some of the above drawbacks by arranging the insulated tube connections for the windings somewhere outside of space occupied by the winding head. To achieve this, a number of individual turns of the exciter winding are provided with a coolant conduit connection, each of which extends axially out of the winding head and is connected to an insulated coolant connection which is arranged in the shaft end. Here, too, the liquid is piped into the rotor on the exciter side and is taken out of the rotor on the turboside. This arrangement has a number of drawbacks. For one thing, it is difficult properly to mount and support the individual windings which are provided with the coolant connections and which extend out of the winding lead. Furthermore, the coolant conduit connections occupy a considerable amount of space which has the practical consequence that it is simply not possible to provide liquid cooling for each and every half-turn. Moreover, in view of the additional space required, and also because of the liquid connections at the turboside, the axial distance between the rotor bearings is increased; this, in turn, reduces the resonant frequency of the rotor. Another problem is that of how properly to insulate the liquid connections, and a perhaps still more serious problem is that of vibrations resulting from the axially extended turns of the exciter winding. Moreover, there are problems due to the expansion of the piping and of the turns, which lead to the undue stressing, and hence rupturing, of the piping. This, of course, goes against the various safety requirements. Unfortunately, the measures taken in an attempt to overcome these drawbacks lead to reduced overall efficiency of the cooling system.

In yet another known system, there is an inlet chamber which surrounds one shaft end portion and a collector chamber which surrounds the other shaft end portion, these chambers being located axially outside of the regions occupied by the respective winding heads. Inlet and outlet tubes are run from these chambers to the windings, these tubes running axially along the surface of the respective shaft end portion and then being bent toward the respective winding head and finally communicating with the transverse portions of the respective conductors. It is with this type of arrangement that the present invention is concerned, it being the object of the invention to overcome the drawbacks of conventional systems of this type. These drawbacks include the fact that the coolant inlet and outlet tubes are arranged on opposite sides of the machine and reduce the cross section of the rotor, due to the presence of central and radial bores. Furthermore, there exists the danger that the tubes will break, because the tubes extend from the shaft end portions directly to the shaft, in a radial direction. This means that if the end portions of the shaft are subjected to bending moment, the end portions and the winding head will move radially with respect to each other, and this subjects the tubes to high, alternating compression and tension. Furthermore, thermal expansions and contractions of the rotor winding, as well as vibrations of the rotor windings, subject the tubes to various mechanical stresses. All of this, of course, greatly increases the likelihood that the tubes will break, and since, for various reasons, it is preferable to make each of the tubes of a single piece, rupture of even one tube results in expensive repairs.

SUMMARY OF THE INVENTION

According to the present invention, there is provided a rotor arrangement incorporating liquid-cooled winding elements, based on the structure last described above. In particular, according to the present invention, the coolant conduit system is so arranged that the windings are cooled without weakening the rotor at important places and without unduly reducing the cross section of the rotor.

The arrangement, according to the present invention, is, moreover, such that the inlet and outlet tubes, as well as their connections, will not be subjected to undue stresses.

Furthermore, the arrangement according to the present invention makes it possible to construct a machine of the above type which, in case a leak develops, can easily be repaired.

The above results are achieved in that, in accordance with the present invention, outlet chambers are provided, in a pole plane of the machine, around the circumference of that end portion of the rotor shaft which does not transmit any torque, i.e., the exciter side, there being inlet chambers of segment-shaped cross section while lie between the outlet chambers. Moreover, the inlet and outlet tubes which are in liquid communication with the windings proper are so configured and arranged as to avoid the above drawbacks.

More particularly, there is provided, in accordance with the present invention, a rotor arrangement having at least one given pole plane and comprising an elongated rotor shaft having a central portion and opposite end portions of which only the second end portion is torque-transmitting. The rotor shaft carries a winding which is constituted by hollow elements which themselves have first transverse portions forming part of an axially extending first winding head and second transverse portions forming part of an axially extending second winding head. The first winding head is located in the region of the first end portion of the rotor shaft but is spaced from the extreme end thereof, while the second winding head is located in the region of the second end portion of the rotor shaft but spaced from the extreme end thereof. The first transverse portions have openings forming fluid inlets and the second transverse portions have openings forming fluid outlets. Inlet and outlet chamber means are arranged about the circumference of the first end portion of the rotor shaft and are located between the extreme end of the first end portion and the axial region occupied by the first winding head. The outlet chamber means include individual chambers located in the pole plane and the inlet chamber means include individual chambers of segment-shaped cross section, the same lying circumferentially between the outlet chambers. A collector chamber is arranged about the circumference of the second end portion of the rotor shaft and is located between the extreme end of the second end portion and the axial region occupied by the second winding head. A plurality of inlet tubes are provided for establishing fluid communication between the individual inlet chambers and the fluid inlets of the respective hollow elements and a plurality of outlet tubes are provided for establishing fluid communication between the fluid outlets of the respective hollow elements and the collector chamber. Each tube extends from its respective chamber axially along the circumference of the respective end portion of the rotor shaft and interiorly of the respective winding head to a point past the axial region occupied by the respective winding head. Each tube is then bent 180° back toward the respective winding head and extends axially along an imaginary cylinder which is interiorly of and coaxial with the respective winding head. Each tube then extends into a respective interspace between winding elements and then extends arcuately in approximately circumferential direction to the fluid opening of the transverse portion of a respective hollow winding element. A return conduit is provided for establishing fluid communication between the collector chamber and the outlet chambers, these return conduit means being arranged in the pole plane and extending along the circumference of the rotor shaft.

BRIEF DESCRIPTION OF THE DRAWINGS

FIGURE 2 is a sectional view taken on line 2—2 of FIGURE 1.

FIGURE 3 is a sectional view taken on line 3—3 of FIGURE 1.

FIGURE 4 is a sectional view taken on line 4—4 of FIGURE 1.

DESCRIPTION OF THE PREFERRED EMBODIMENTS

Figure 1:
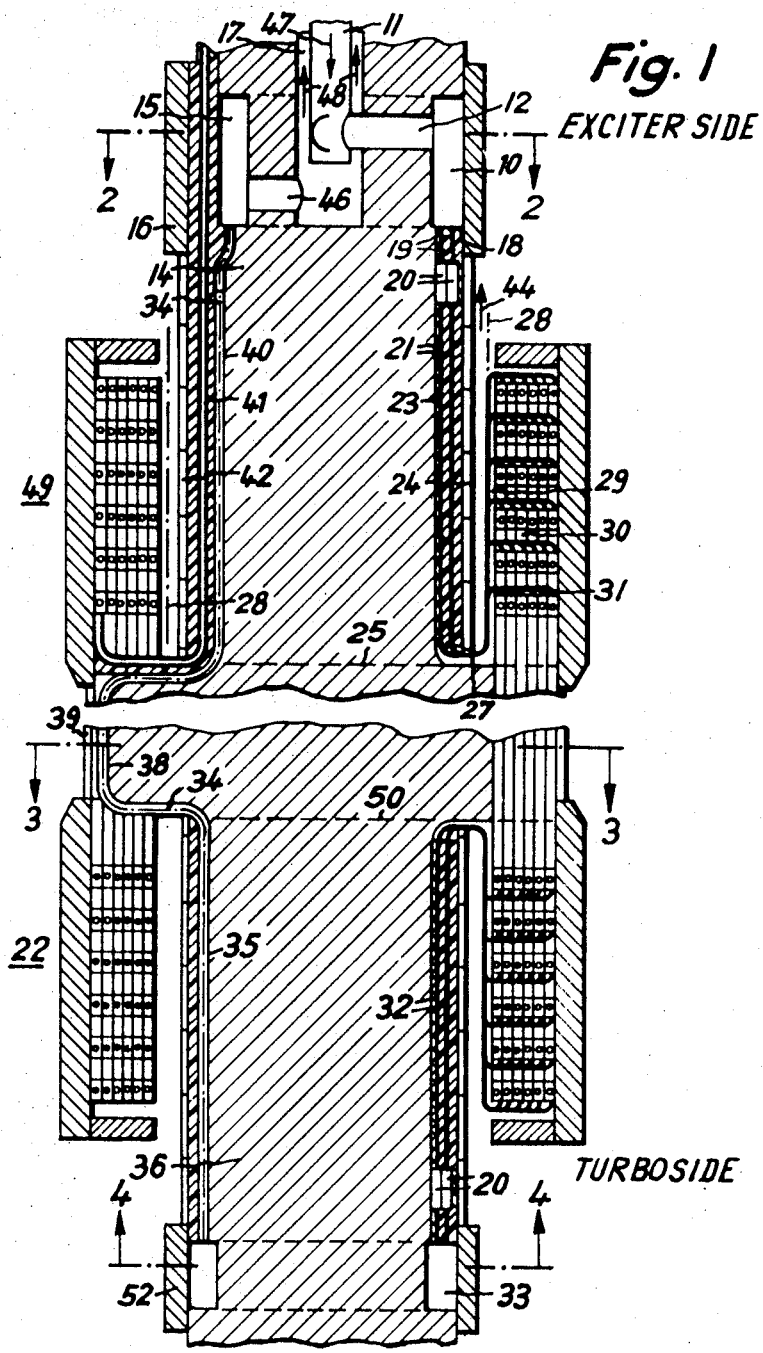
FIGURE 1 is a sectional view of one embodiment of a two-pole inductor of a turbogenerator according to the present invention, FIGURE 1 being taken on line 1—1 of FIGURE 2. The right and left sides of the embodiment are labeled "EXCITER SIDE" and "TURBOSIDE," respectively.

Referring now to the drawings, the same show one embodiment of a turbogenerator according to the present invention wherein the cooling liquid is made to flow, in the direction indicated by arrow 47, through a central, axially extending conduit 11 provided in the exciter-side end portion 14 of the rotor shaft. As shown in FIGURE 1, the conduit 11 extends almost as far as the axial region occupied by the winding head 49 which is arranged on the exciter side. The coolant flows from the conduit 11 through radial channels 12 to two inlet chambers 10 and 13 located at the periphery of the shaft end portion 14. The exciter-side system of coolant chambers extends 360° around the circumference of the shaft end 14 and consists, in addition to the inlet chambers 10 and 13 of segment-shaped cross section which take up the major portion of the entire circumference and which are arranged symmetrically with respect to the pole plane +P—P, of two outlet chambers 15 and 45 which extend throughout but a small portion of the circumference and which lie in the pole planes +P and —P between the inlet chambers 10 and 13. The system of chambers is held in place on the shaft end portion 14 against the centrifugal force which is exerted on them during rotation of the shaft by means of a contracted ring 16. The two outlet chambers 15 and 45 communicate, via further radial channels 46, with another central conduit 17 which surrounds and is coaxial with the conduit 11. The coolant flows axially out of the system in the direction of the arrow 48.

The structure further comprises a plurality of coolant tubes 19, equal in number to the number of turns of the entire exciter winding. The tubes 19 communicate with the inlet chambers 10 and 13 at the end surfaces 18 thereof which are directed toward the winding head 49 and are arranged in two concentric rows which are symmetrical to the pole plane. Each tube 19 has associated with it a respective connector 20 which serves as an electrical insulator and which, considered in the axial direction indicated by arrow 44, is located shortly ahead of the inlet chambers 10, 13. Each connector 20 has connected to it an inlet tube 21 having a nominal diameter of about 10 mm. and a correspondingly low inherent rigidity. All of the insulated connectors 20 and inlet tubes 21 are received in axial grooves 23 provided in the shaft end portion 14. The grooves 23 are symmetrical with respect to the pole plane and are closed off by means of keys 24. Arranged within each groove 23 are two insulating connectors 20 and two inlet tubes 21, the two sets of connectors and inlet tubes being arranged one above the other, i.e., radially with respect to the shaft.

All of the inlet tubes 21, are, throughout their entire lengths, electrically insulated. The systems incorporating the chambers 10, 13, 15, 45 and the exciter-side connectors 20 are located, considered axially, beyond the exciter-side winding head 49, i.e., between the extreme end of the end portion and the axial region occupied by the winding head 49. Each of the inlet tubes 21 extends axially to a point just short of one end face 25 of the inductor body 26, the tubes 21 running within the shaft end portion 14 and radially interiorly of the winding head 49. At this point just short of end face 25, each of the tubes 21 passes out of its respective groove 23 and is bent through an angle of 180° in the form of a relatively large-diameter bow so as to allow for expansion. The tubes 21 then come to lie in an imaginary cylinder 28 which surrounds the shaft end portion 14 and is coaxial therewith, the cylinder 28 being located interiorly of the winding head 49. The tubes 21 are supported and connected in the region of the cylinder 28 by means of fillers (not shown) which are located between the cylinder 28 and the winding head 49 and which lie against the winding head at 29. From there, the inlet tubes 21 extend beyond the region of the cylinder 28 and into the respective interspaces 30 that are formed between the individual windings that make up the winding head 49, the points at which the tubes 21 connect with the windings being indicated at 31.

Figure 5:
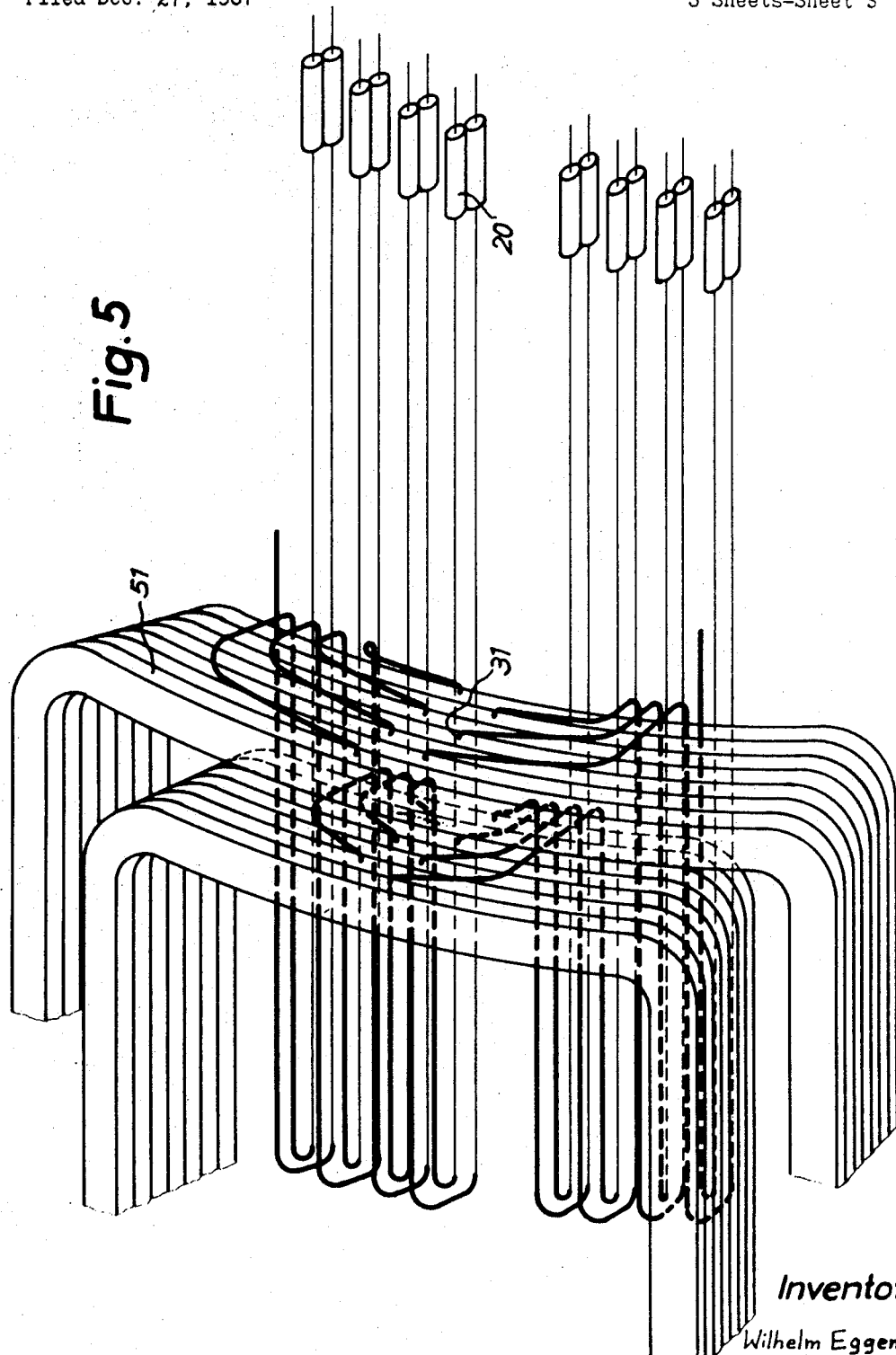
FIGURE 5 is a perspective view showing the tubes and windings connected thereto.

Thus, in the above-described embodiment, the inlet tubes 21 extend axially from the inlet chambers 10 and 13 to the end face 25 and are rigidly positioned in the shaft end portion 14. From the end face, the tubes are bent and continue their paths in two sections, the first being the 180° arc 27 and the axial extension in the region of the cylinder 28, and the second being located in the interspaces 30 wherein the tubes 21 extend in a wide arc, similar to the transverse portions 51 of the conductor elements of the windings (see FIGURE 5), from the center of the winding toward the point of connection 31. This spatial arrangement of the two sections causes the tubes to assume the configuration of an elastically bent tube so that axial, radial and tangential shifting and vibrations of the transverse portions 51 are easily taken up by the tubes 21 without any force being exerted on the fluid inlet junction 31, which, in practice, are generally soldered junctions. Each tube 21 will generally consist of a single piece which extends from the point 19 at which it is connected to the inlet chamber, or from the connector 20, to the inlet 31. The liquid communication between the tubes 21 and the hollow conductors or windings is established by the specially configured transverse conductors 51, to which the tubes 21 are firmly soldered.

The liquid coolant flows from inlet 31 into the interior of the transverse conductor portion 51 and from there flows right and left (considered in circumferential direction), the flows being divided between respective half-turns of the winding. The two flows of liquid coming out of the two half-turns on the turboside winding head 22 are once more combined with each other and will next flow through an outlet tube 32 with which the fluid outlets of the turboside transverse conductor portions communicate. The physical and functional arrangement of the outlet tubes 32 are similar to that of the inlet tubes 21 on the exciter side. Each outlet tube 32 is bowed toward the turboside end face 50 of the inductor body 26 and is connected via an electrically insulating connector 20 to the coolant collector chamber 33 which is held in place against centrifugal force by means of a contracted ring 52, see FIGURES 1 and 4. The connections 20 on the turbine side and the collector chamber 33 lie axially beyond the winding head 22, i.e., between the extreme end of shaft end portion 36 and the axial region occupied by the turboside winding head 22. This collector chamber 33 is a closed annular chamber which encompasses the entire 360° circumference of the shaft end portion 36 and has connected to it four coolant return conduits 34 which are in the pole plane +P—P, there being two in plane +P which are parallel and next to each other and two in the —P plane which are parallel and next to each other. The purpose of these return conduits 34 is to pipe all of the coolant from the turboside back to the exciter side. The return conduits 34 are arranged in axial grooves of the shaft end 36 and extend as far as the end face 50 of the inductor body 26. From there, they extend to the outer surface 37 of the poles, wherein they extend through axial grooves 38 which are provided for this purpose and which extend throughout the entire length of the inductor body 26. The grooves 38 are closed off by means of keys 39, see FIGURES 1 and 3. In this way, the coolant has now once more reached the exciter side.

Next, the return conduits 34 run in axial groove 40 in the shaft end 14, there being one such groove for each pole. These grooves 40, however, are deeper than the grooves 35 and accommodate, in addition to the return conduits 34, an insulated slip ring lead 41, the latter being positioned radially outwardly of the return conduits 34. This arrangement makes optimum use of the circumference of the shaft end portion for placing the coolant chamber conduits. The return conduits 34 communicate with the two outlet chambers 15 and 45, from whence the coolant flows to the final outlet from the machine via the radial channels 46 and the annular channel 17.

The grooves in which the windings are arranged are shown at 43, see FIGURE 3. Each of the inlet chambers 10, 13, the outlet chambers 15, 45, and the collector chamber 33 is a separate entity and is positioned in appropriate grooves formed in the shaft end portions 14, 36.

In practice, the inlet and outlet tubes 21, 32, may be made of copper and each of the insulating connectors 20 may be provided with a copper connecting nipple which is directed toward the respective inlet or outlet tube.

Thanks to the above arrangement, the rotor windings will be cooled with a high degree of efficiency, primarily because there are as many inlet and outlet tubes as there are winding turns. It will be appreciated that the above-described structure makes it not only possible but also practical to accommodate such a large number of inlet tubes because they can be distributed over a large proportion of the entire 360° circumference of the rotor and still be placed in fluid communication with the individual inlet chambers which, together, extend throughout a proportion of the circumferential length of the exciter-side rotor end portion 14 which is substantially greater than the proportion of the circumferential length which is occupied by all of the individual outlet chambers. Also, a large part of the 360° circumference is available to position the inlet tubes in such a way as to place them in fluid communication with the windings. The same, of course, applies to the outlet chambers which place the outlets of the windings in fluid communication with the collector chamber 33 in the turboside end portion of the rotor shaft.

Another practical advantage of the above-described structure is that it lends itself to simple manufacturing and engineering solutions. Since each inlet and outlet tube is in fluid communication with but one turn of the winding, the mentioned nominal diameter of 10 mm. is sufficient, so that there is no problem in withstanding the high internal pressure of the coolant, which is maximally of the order of about 220 atmospheres when the turbogenerator is operating at rated speed. And the fact that tubes of 10 mm. can be utilized, makes it possible to use copper rather than steel tubes. This has the very significant advantage that soldered joints consisting of copper/stainless steel are avoided, and this is important because it has been found that it is much more difficult to provide acceptable copper/copper soldered joints than copper/stainless steel joints. Thus, when the machine is built, it becomes simple to solder each tube to the winding—both now being made of copper—and it is also simple to solder the other end of each tube with the connector 20, particularly if the latter is provided with a copper nipple which faces the tubing.

Also, by the particular way in which the inlet and outlet tubes are configured, especially in the region of the winding head, optimum use is made of the elasticity of the tubing, so that any movement of the winding relative to the shaft, due, for example, to thermal expansion or to vibrations emanating from the end portions of the rotor shaft, will not subject the soldered joints or the insulated connectors to any undue stresses.

Yet another advantage is that inasmuch as none of the windings has to be provided with axial extensions which project beyond the winding head, the distance between the bearings for the rotor can be kept quite small.

Furthermore, so much of the inlet and outlet tubes which is arranged in the winding head has a relatively small mass, so that the rotor sheath will not be subjected to any particular additional stresses. Moreover, thanks to the above-described arrangement, the total mass of the inlet and outlet tubes is distributed evenly about the entire circumference of each winding head.

Also, since the insulated tube connections lie outside of the winding head proper, they are readily accessible in case repairs have to be made. All that is required is that the key means which hold any particular tube in place be removed, it being unnecessary to remove the winding itself.

It will also be noted that, in the structure according to the present invention, the rotor shaft, and particularly the central portion thereof which is the magnetically active part of the inductor, is free of any central, axially extending bore which, but for the provision of the return conduits at the circumference of the rotor, would be needed in order to conduct the coolant from the turboside back to the exciter side. In particular, the return conduits, being located in a pole plane, are located where the pole width is at a maximum, so that the reduction in the cross section will have the least influence on the magnetic flux. Also, the absence of any central axial bore eliminates the need for providing radial conduits leading to it so that the torque-transmitting, turboside end portion of the shaft is not weakened.

Yet another advantage is that the arrangement allows the winding slots to be used to maximum capacity because the very fact that each turn of the winding can be provided with coolant allows the coolant channel of each individual conductor element to be kept relatively small. This, in turn, allows the cross section of the conductor to remain large, so that the efficiency of the machine will be high.

Yet another advantage is that stringent mechanical and electrical safety requirements are met, thanks to the arrangement of the inlet and outlet tubes.

Furthermore, in order to accommodate a large number of tubes, it is best to put at least two in each axial groove. This applies to the inlet and outlet tubes as well as to the return conduit tubes. In the case of the latter, it is advantageous for the tubes to run parallel to each other in the immediate vicinity of a pole, e.g., such as straddling the pole plane, thereby increasing the cooling effect for the pole surfaces. The key means which hold the tubes in place can, if necessary, be easily removed, so as to give ready access to the tubes.

The fact that the slip ring lead is also located in one of the axial grooves in which return conduits are arranged, and that the slip ring lead is outside of the conduit, allows the circumferential length of the inlet chambers of segment-shaped cross section to be longer. And if the outlet chambers are located radially below the inlet chambers, the slip ring lead can extend rectilinearly since it is not necessary to bend the same to avoid the outlet chamber.

If the machine has at least two poles, the number of the inlet chambers of segment-shaped cross section and the number of the outlet chambers are each equal to the number of poles. This allows return conduits to be passed through each pole so that the return conduit cross section can be kept small and so that each pole can be cooled.

It will be understood that the above description of the present invention is susceptible to various modifications, changes, and adaptations, and the same are intended to be comprehended within the meaning and range of equivalents of the appended claims.

We claim:

1. A rotor arrangement having at least one pole plane and comprising, in combination:
    (a) an elongated rotor shaft having a central portion and opposite first and second end portions of which only said second end portion is torque-transmitting;
    (b) a winding carried by said rotor shaft and constituted by hollow elements which themselves have first transverse portions forming part of an axially extending first winding head and second transverse portions forming part of an axially extending second winding head, said first winding head being located in the region of said first end portion of said rotor shaft but spuaced from the extreme end thereof, and said second winding head being located in the region of said second end portion of said rotor shaft but spaced from the extreme end thereof, said first transverse portions having openings forming fluid inlets and said second transverse portions having openings forming fluid outlets;
    (c) inlet and outlet chamber means arranged about the circumference of said first end portion of said rotor shaft and located between the extreme end of said first end portion and the axial region occupied by said first winding head, said outlet chamber means including individual chambers located in said pole plane and said inlet chamber means including individual chambers of segment-shaped cross section and lying circumferentially between said outlet chambers;
    (d) a collector chamber arranged about the circumference of said second end portion of said rotor shaft and located between the extreme end of said second end portion and the axial region occupied by said second winding head;

(e) a plurality of inlet tubes for establishing fluid communication between said individual inlet chambers and the fluid inlets of the respective hollow elements and a plurality of outlet tubes for establishing fluid communication between the fluid outlets of the respective hollow elements and said collector chamber, each tube extending from its respective chamber axially along the circumference of the respective end portion of said rotor shaft and interiorly of the respective winding head to a point past the axial region occupied by the respective winding head, each tube then being bent 180° back toward the respective winding head and extending axially along an imaginary cylinder which is interiorly of and coaxial with the respective winding head, each tube then extending into a respective interspace between winding elements and then extending arcuately in approximately circumferential direction to the fluid opening of the transverse portion of a respective hollow winding element; and (f) return conduit means for establishing fluid communication between said collector chamber and said outlet chambers, said return conduit means being arranged in said pole plane and extending along the circumference of said rotor shaft.

2. A rotor arrangement as defined in claim 1 wherein the proportion of the circumferential length about said one end of said shaft rotor which is occupied by all of the individual chambers constituting said inlet chamber means is substantially greater than the proportion of the circumferential length which is occupied by all of the individual chambers constituting said outlet chamber means.

3. A rotor arrangement as defined in claim 1 wherein there is provided for each of said tubes an insulating connection which is interposed between the respective tube and the respective chamber with which the tube is in communication, said connections being arranged in axial grooves provided in the respective shaft end portion, and there being key means for radially securing said connections.

4. A rotor arrangement as defined in claim 3 wherein each of said grooves has arranged in it at least two tubes which are positioned radially one above the other.

5. A rotor arrangement as defined in claim 3 wherein said insulating connection is provided with a connecting nipple which is directed toward the respective tube and which is made of copper.

6. A rotor arrangement as defined in claim 1 wherein said tubes are made of copper.

7. A rotor arrangement as defined in claim 1 wherein each respective tube consists of a single piece.

8. A rotor arrangement as defined in claim 1 wherein said return conduit means comprise tubes which are arranged in axial grooves of said rotor shaft, there being key means for radially securing said last-mentioned tubes.

9. A rotor arrangement as defined in claim 8 wherein at least two of said return conduit tubes extend parallel next to each other in the immediate vicinity of each pole.

10. A rotor arrangement as defined in claim 8 wherein said return conduit means extend, throughout a portion of their length, in an axial groove provided in said first end portion of said rotor shaft, there further being arranged in said last-mentioned axial groove a slip ring lead, the latter being arranged radially outside of said return conduit means, there further being key means for radially securing said lead and return conduit means in said last-mentioned groove.

11. A rotor arrangement as defined in claim 10 wherein the axial groove within which said lead is arranged lies in said pole plane, and wherein said individual outlet chambers lying in said pole plane are radially inwardly with respect to said individual inlet chambers.

12. In an electrical machine having at least two poles, a rotor arrangement as defined in claim 1 wherein the number of individual inlet chambers and the number of individual outlet chambers are each equal to the number of poles.

13. In a turboelectric machine, a rotor arrangement as defined in claim 1 wherein said first end portion of said rotor shaft is at the exciter side of the machine and said second end portion of said rotor shaft is at the turbo side of the machine.

References Cited

UNITED STATES PATENTS

| | | | |
|---|---|---|---|
| 2,898,484 | 8/1959 | Krastchew | 310—54 X |
| 3,034,003 | 5/1962 | Seidner | 310—61 |
| 3,097,317 | 7/1963 | Fechheimer | 310—54 |
| 3,131,321 | 4/1964 | Gibbs et al. | 310—54 |
| 3,243,616 | 3/1966 | Tudge et al. | 310—54 |
| 3,296,470 | 1/1967 | Barbashev et al. | 310—54 |
| 3,320,447 | 5/1967 | Banchieri | 310—54 |
| 3,340,412 | 9/1967 | Wiedemann | 310—61 X |

MILTON O. HIRSHFIELD, Primary Examiner

D. F. DUGGAN, Assistant Examiner

U.S. Cl. X.R.

310—61